US005794056A

United States Patent [19]
Brown

[11] Patent Number: 5,794,056
[45] Date of Patent: Aug. 11, 1998

[54] SYSTEM FOR AUTOMATIC BUFFERING OF COMMANDS FOR DASD UNITS

[75] Inventor: Dana H. Brown, Rochester, Minn.

[73] Assignee: International Business Machines Corporation, Armonk, N.Y.

[21] Appl. No.: 707,095

[22] Filed: Sep. 3, 1996

Related U.S. Application Data

[63] Continuation of Ser. No. 130,980, Oct. 4, 1993, abandoned.

[51] Int. Cl.[6] .................. G06F 9/00; G06F 13/00
[52] U.S. Cl. .................. 395/750.01; 395/750.03
[58] Field of Search ............... 395/849, 439, 395/449, 250, 180, 750.01, 750.03; 360/78.07, 78.09, 72.1, 51

[56] References Cited

U.S. PATENT DOCUMENTS

| | | | |
|---|---|---|---|
| 4,241,420 | 12/1980 | Fish et al. | 395/439 |
| 4,527,233 | 7/1985 | Ambrosius, III et al. | 295/250 |
| 4,583,166 | 4/1986 | Hartung et al. | 395/440 |
| 5,113,509 | 5/1992 | Pennings et al. | |
| 5,115,225 | 5/1992 | Dao et al. | |
| 5,128,995 | 7/1992 | Arnold et al. | |
| 5,131,082 | 7/1992 | Bonevento et al. | |
| 5,235,692 | 8/1993 | Ayres et al. | 395/849 |
| 5,239,640 | 8/1993 | Froemke et al. | 395/180 |
| 5,255,132 | 10/1993 | Galbraith et al. | 360/51 |
| 5,307,216 | 4/1994 | Cook et al. | 360/72.1 |
| 5,381,282 | 1/1995 | Arai et al. | 360/78.07 |
| 5,510,939 | 4/1996 | Lewis | 360/78.09 |

OTHER PUBLICATIONS

"Dynamically Maintained Command Chains", IBM Technical Disclosure Bulletin, vol. 24, No. 12, New York, U.S., May, 1992, pp. 6605–6606.

*Primary Examiner*—Robert B. Harrell
*Assistant Examiner*—Saleh Najjar
*Attorney, Agent, or Firm*—Matthew J. Bussan; Andrew J. Dillon

[57] ABSTRACT

A direct access storage device may handle various disk drive management functions without contemporaneous host computer involvement by buffering commands for the management functions in controller memory. The commands may be read into controller memory from the disk drive on power up or programmed by the host computer. Initially the commands are treated as processes in a blocked state. Operating statistics kept by a supervisor program for the controller are monitored by an event handler, which moves processes to a ready to run state upon occurrence of specified conditions. A dispatcher then moves commands into the direct access storage controller for execution and subsequent return to blocked status.

21 Claims, 8 Drawing Sheets

SYSTEM FOR AUTOMATIC BUFFERING OF COMMANDS FOR DASD UNITS

This is a continuation of application Ser. No. 08/130,980, filed Oct. 4, 1992 now abandoned.

BACKGROUND OF THE INVENTION

1. Technical Field:

This invention relates to personal computer systems and in particular to a method and device for improving operation of direct access data storage devices (DASDs) used with such systems. Still more particularly the invention relates to buffering of commands for independent execution by a DASD controller.

2. Description of the Related Art:

Personal computer systems in general and IBM personal computers in particular have attained widespread use in contemporary society. Personal computer systems can usually be defined as a desktop, floor standing, or portable microcomputer that consists of a system unit having a single system processor, a display monitor, a keyboard, one or more diskette drives, a fixed disk DASD unit, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

DASDs are used for long term storage of data in personal, and other, computer systems. A disk drive is one type of storage medium used in a DASD. A disk drive has at least one rotatable magnetic disk for data storage. Data are represented on the disk as a series a magnetically polarized regions. The magnetic regions are arrayed along the surface of the disk along either a plurality of concentric data tracks or spiral data tracks. A read/write transducer may be used to read data from or write data to the various tracks on the disk while the disk moves underneath the transducer.

It is typical for the host personal computer to initiate commands to the DASD controller for reading data from or writing data to a disk drive and to provide other DASD management functions. While many management functions necessarily entail host involvement, such as reads and writes of data to the DASD unit, useful functionality which does not require host involvement is conceivable. The controllers for many DASD units have sufficient processing power to initiate and execute commands automatically, particularly in personal computers supporting high level interfaces such as small computers system interface (SCSI), PC/AT, PC/XT, etc.

SUMMARY OF THE INVENTION

One object of the present invention is to provide an improved personal computer system.

Another object of the present invention is to provide a method and apparatus for improving operation of direct access data storage devices (DASDs) used with personal computer systems.

Yet another objective of the present invention is to provide a system and method for buffering commands for independent execution by a DASD controller.

The invention provides a direct access storage device with self actuated management. The storage device includes an interface for connection to a host system bus, a disk drive for storing data and instructions, a buffer connected to the interface for holding data and instructions being read out from the disk drive to the host system bus or received over the host system bus for writing to the disk drive, and a controller responsive to commands applied by a host computer or selected from a command set for managing the disk drive. A portion of the buffer is reserved for the purpose of receiving and storing commands for execution by the controller. The controller executes a supervisory program which, in response to predetermined events, executes the commands. An event handler is executed by the controller as part of the supervisor for transferring the selected commands to a ready queue and a dispatcher provides transfer of the selected commands in the ready queue to the controller for execution. Commands placed in the buffer may be selected by the user or automatically loaded from disk to the buffer.

BRIEF DESCRIPTION OF THE DRAWINGS

The foreground aspects and other features of the present invention are explained in the following written description, taken in connection with the accompanying drawings, wherein.

DETAILED DESCRIPTION OF THE INVENTION

The following detailed description is of the best presently contemplated mode for carrying out the invention. This description is not to be taken in a limiting sense but is made merely for the purpose of illustrating the general principles of the invention since the scope of the invention is best defined by the appending claims.

I. Organization of a Computer System

Figure 1:
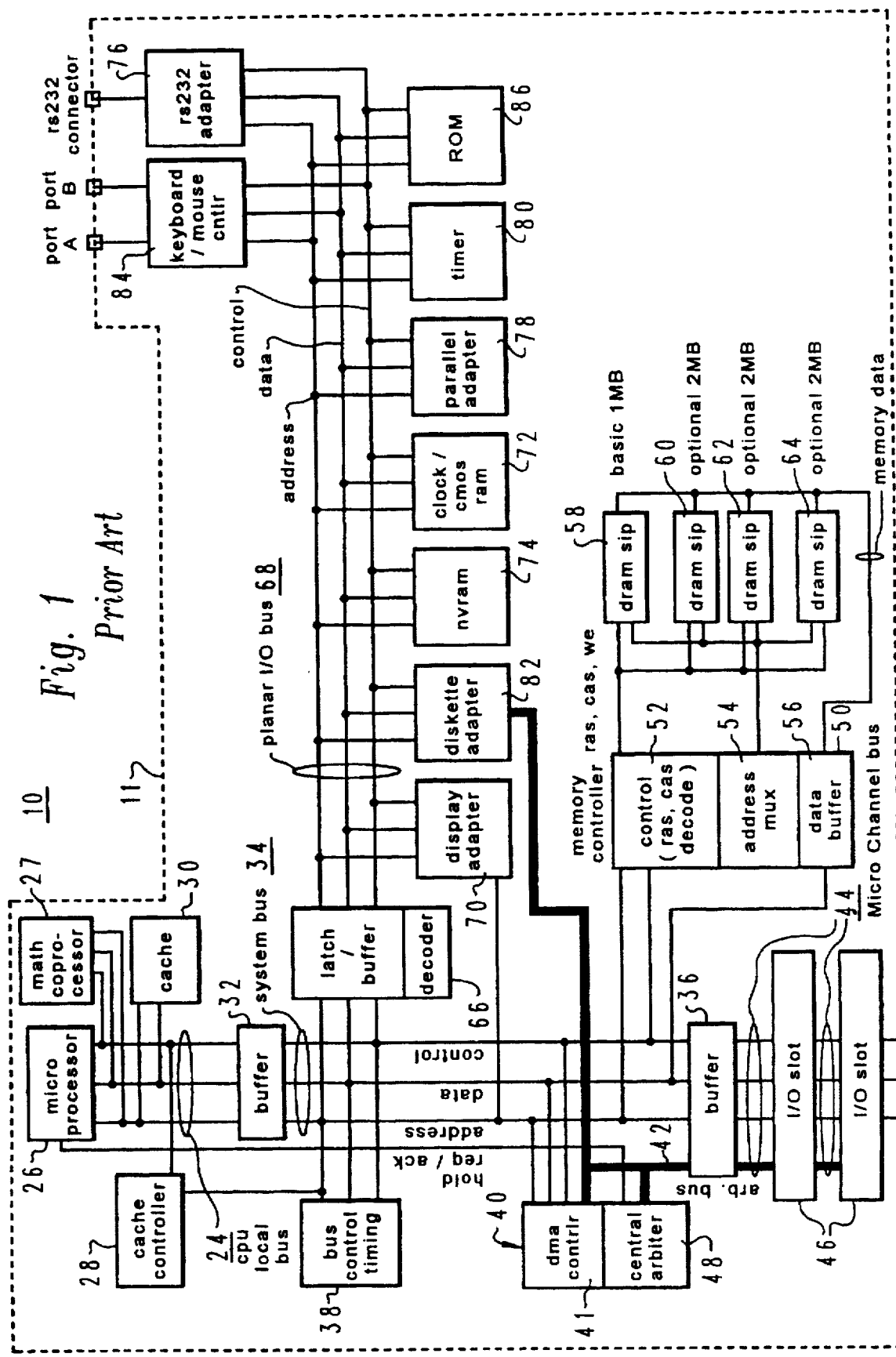
FIG. 1 is a block diagram of a personal computer system in which the present invention can be employed.

Referring to FIG. 1, there is shown a block diagram of the Personal Computer System 10 illustrating the various components of the Computer System. FIG. 1 further illustrates components of the planar 11 and the connection of the planar 11 to the I/O slots 46 and other hardware of the Personal Computer System 10. Connected to the planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. Among suitable microprocessors for CPU 26 are the 80386 and 80486 sold by Intel. It is contemplated that the apparatus and methods in accordance with the present invention may be used with other hardware configurations of the planar board.

CPU local bus 24 (comprising data, address and control components) provides for the connection of CPU 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a Direct Memory Access (DMA) unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. I/O slots 46 may be used for access to mass storage devices through hard drive controllers described below. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 1 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70, a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes a Basic Input Output System (BIOS) which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

II. DASD Features and Operation

Figure 2:
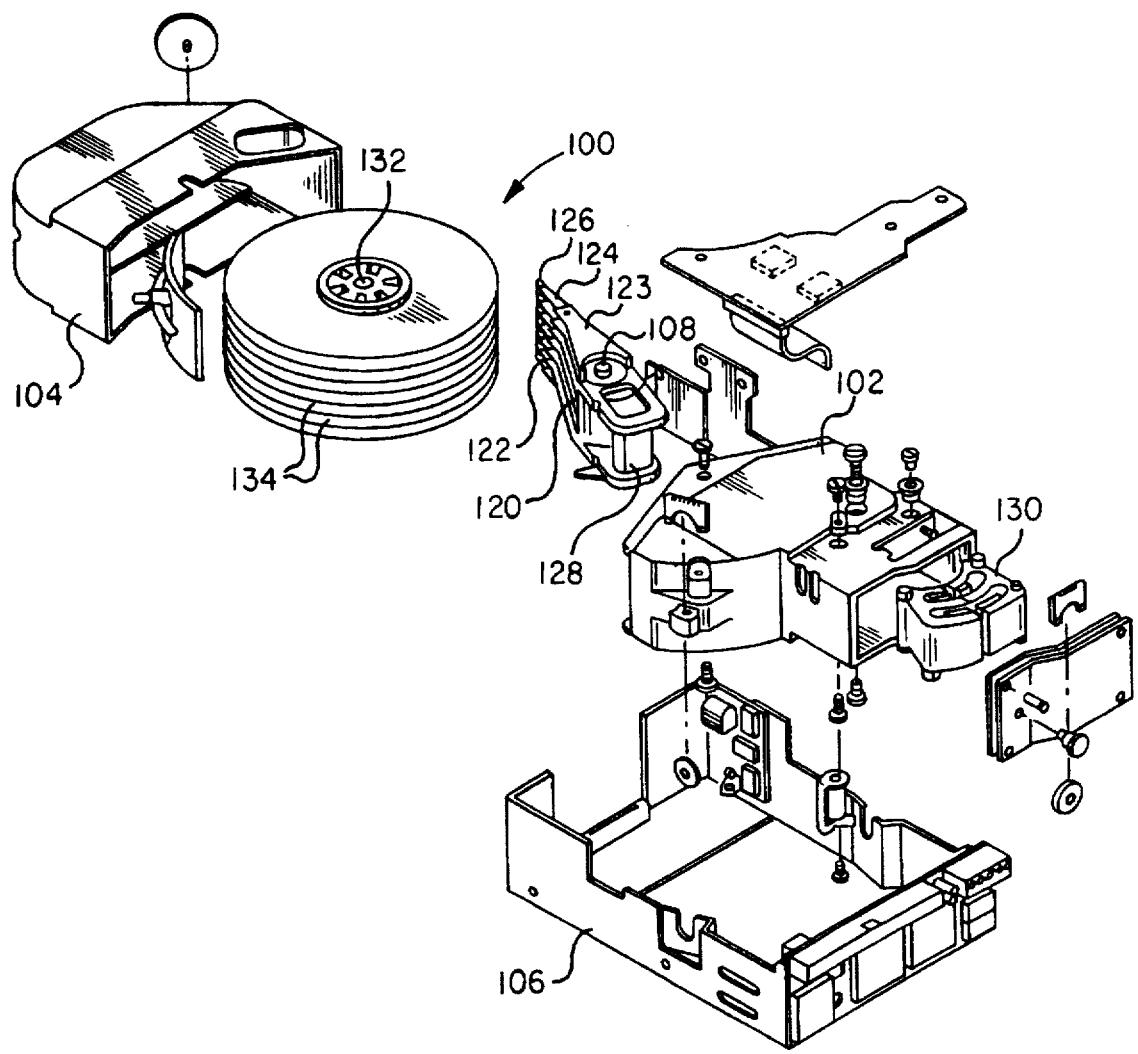
FIG. 2 is an exploded perspective view of a disk drive.

FIG. 2 is an exploded view of a disk drive 100. The disk drive 100 includes a housing 102, and a housing cover 104 which, after assembly, is mounted within a frame 106.

Rotatably attached within the housing 102 on an actuator shaft 108 is an actuator arm assembly 120. One end of the actuator arm assembly 120 includes an E block or comb like structure 122 having a plurality of arms 123. Attached to the separate arms 123 on the comb or E block 122, are load springs 124. In this case, the load springs form the suspension. Attached at the end of each load spring is a slider 126 which carries a pair of magnetic transducers or the head. The transducers may be of an inductive type, or may include a read transducer of a magnetoresistive type. On the other end of the actuator arm assembly 120 opposite the load springs 124 and the sliders 126 is a voice coil 128.

Attached within the housing 102 is a pair of magnets 130. The pair of magnets 130 and the voice coil 128 are key parts of a voice coil motor which applies a force to the actuator arm assembly 120 to rotate it about the actuator shaft 108. Also mounted within the housing 102 is a spindle shaft 132. Rotatably attached to the spindle shaft 132 are a number of disks 134. In FIG. 2, eight disks are attached to the spindle shaft 132. As shown in FIG. 2, the disks 134 are attached to the spindle shaft 132 in spaced apart relation. An internal motor (not shown) rotates the disks 134.

Figure 3:
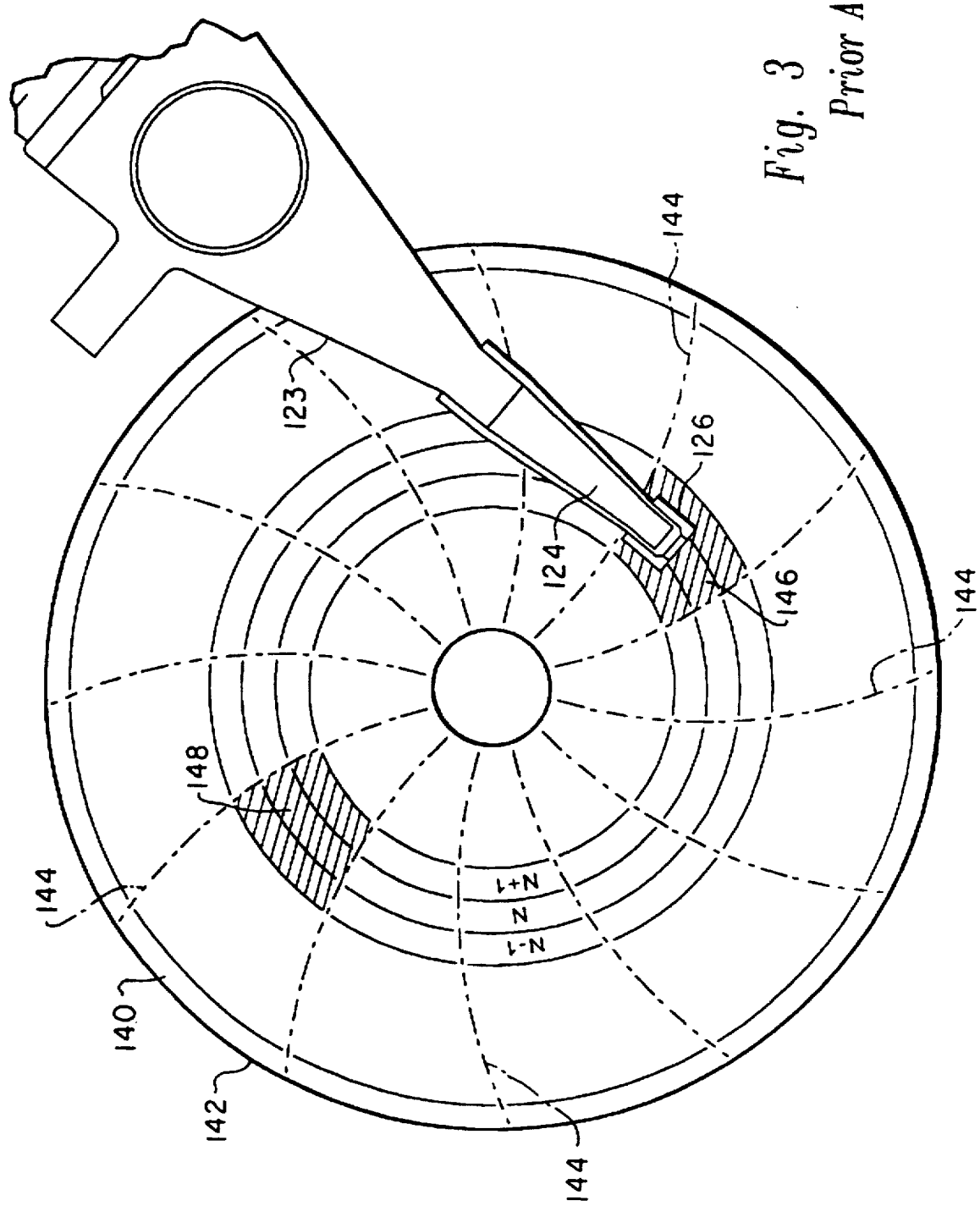
FIG. 3 is a top plan view of a disk drive.

FIG. 3 illustrates positioning of slider 126 by an arm 123 over one of a plurality of tracks (1 to N+1) on a magnetic surface of 140 of a disk 142. Each track is divided into segments or sectors by a plurality of track servo fields 144 extending radially from the center of disk 140. Track servo fields curve to conform to the travel of slider 126 at the end of rotatable arm 123. If disk rotational speed is constant, a transducer mounted to slider 126 encounters a track servo field 144 at strict intervals of times. If a linearly actuated armature is used, track servo fields 144 are straight. Tracking information is derived from servo fields 144 in a manner well known in the art. Slider 126 flies blind between servo fields. In a preferred embodiment of the invention one or more tracks is reserved for a DASD controller and contains a list of commands for downloading from disk to DASD controller buffer for possible execution by the DASD controller.

Figure 4:
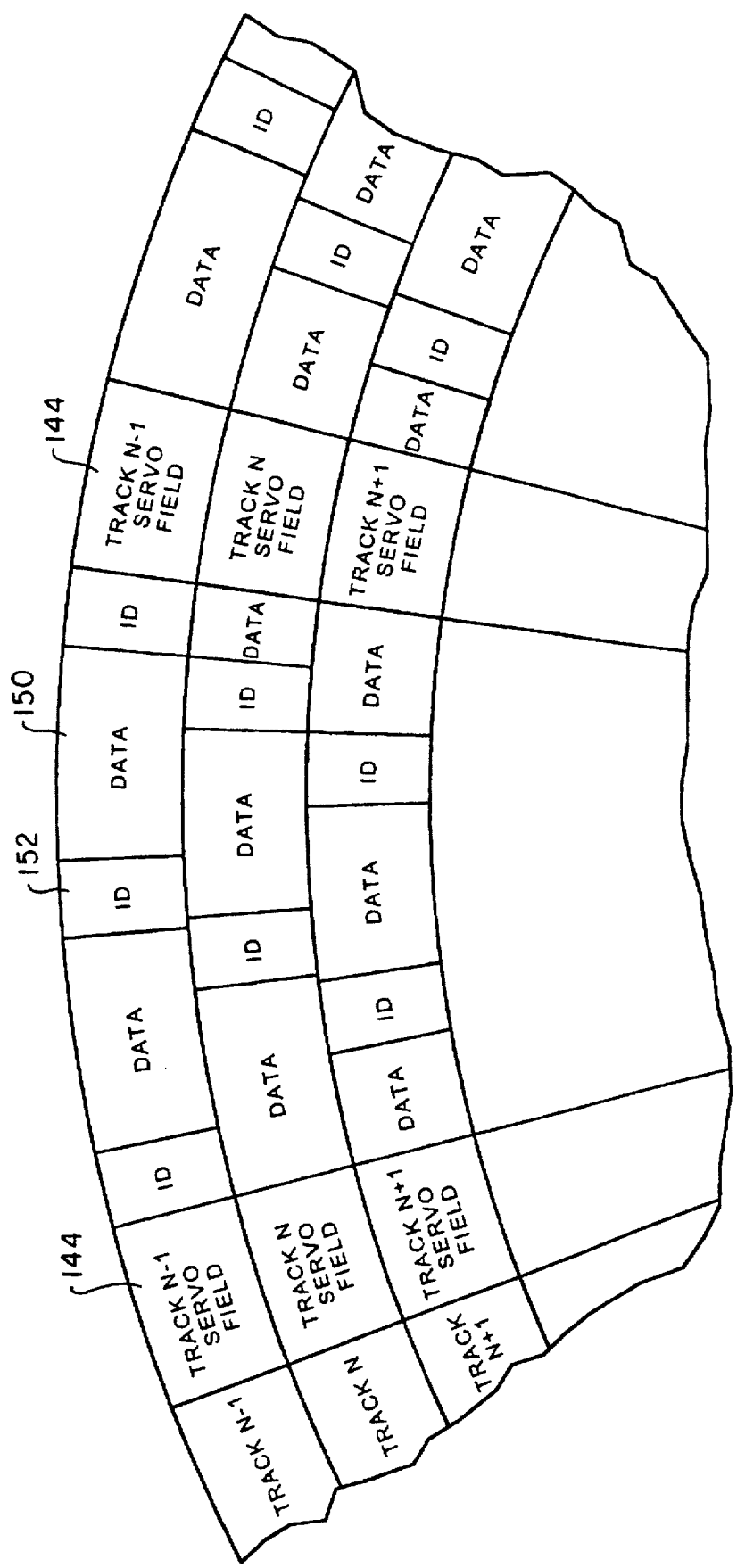
FIG. 4 is a schematic illustration of the organization of data on a disk drive.

FIG. 4 details the positional relationship of data fields to other types of fields on disk 140. Tracks N−1, N, and N+1 are depicted each having had written thereto a plurality of data fields 150. Each data field 150 is preceded by an ID field 152. Data fields can straddle a servo field 144. While a data field generally includes a preliminary synchronization field (not shown), a second synchronization field (not shown) may be included after a servo field where it bisects a data field.

Some disk drives have one data field per data sector positioned between each track servo field. The servo fields function as data sector boundaries. In other types of disk drive, a data field may straddle parts of more than one data sector and thus more than one data field may be positioned between a pair of servo fields.

Figure 5:
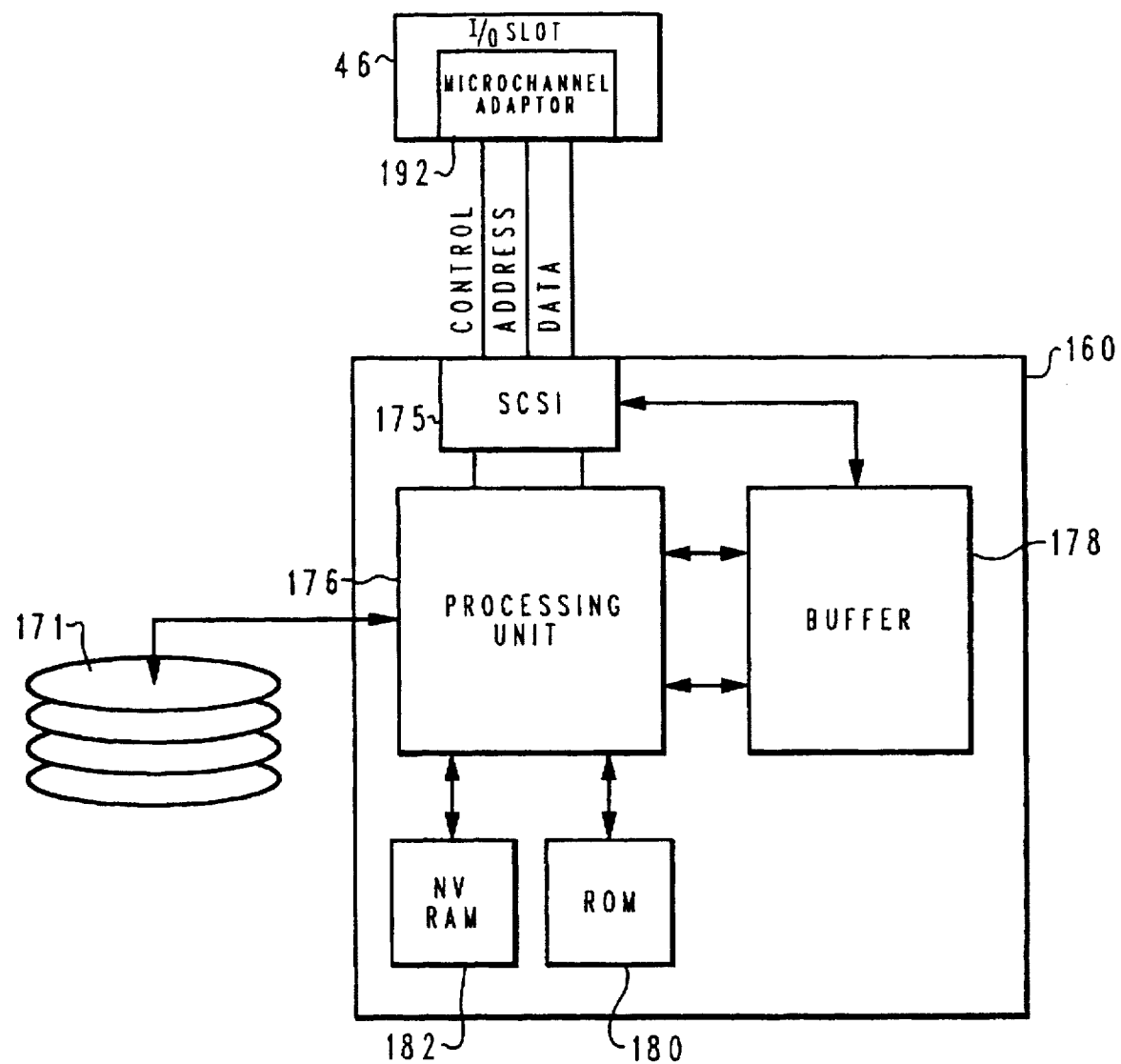
FIG. 5 is a block diagram of a controller unit for a direct access storage device, such as a disk drive.

FIG. 5 is a block diagram of a DASD controller 160 and disk drive 171. DASD controller 160 communicates with a host computer system through an interface 175 such as a small computer system interface (SCSI). For computer system 10 the SCSI 175 is connected to a microchannel adaptor 192 which may be plugged into an input/output slot 46 for microchannel bus 44. Microchannel bus 44 includes data lines, command lines, address lines and may include an arbitration line. DASD controller 160 controls the storage of data to and the recovery of data from a fixed disk drive 171. Conventionally, device controller 160 includes buffer 178 for temporarily holding data in transit between a host system and disk drive 171. Control unit 160 and buffer 178, in particular, are controlled by a processor unit 176.

Processor unit 176 may be initialized upon system power up, or it may have access to a small read only memory (ROM) 180 and a small nonvolatile random access memory (NVRAM) 182 for programming. ROM 180 may hold a supervisor program executable on processor unit 176 to carry out the process of the invention. Non-volatile RAM is currently relatively expensive and preferably minimally sized. As provided by the invention, processing unit 176 may access buffer 178 for commands for execution.

III. Command Buffering for Control of DASD Operations

Virtually all direct access storage devices employ built-in device controllers to support high level interfaces and thus the capability exists for the device controller to initiate an execute commands automatically. Notwithstanding this feature, most contemporary DASD units rely on host system initiation of commands. The invention provides automatic command queuing for a device controller 176. A reserved location within buffer 178 is utilized to store the commands. The reserved location may be filled by the host system at any time to suite the host system's purposes or it may be filled upon power up of the disk drive using a default set of commands loaded from a reserved track on the disk. Loading of commands from disk to buffer may be readily provided by minor modification of, for example, a "config-.sys" file in the DOS operating system. Once the commands are loaded into buffer 178, occurrence of predetermined events will result at execution of a command from the buffer as if the host system had sent the command directly to the DASD controller. The effect is that the host is freed from having to make routine or repetitive commands which in themselves are potentially useful for disk drive management.

In one implementation of the invention, editing of the contents of the reserved location (command buffer) is provided through the host computer. The number and type of commands and conditions supported is completely DASD implementation dependent. For this example, a special SCSI (or PC/AT if appropriate) command is provided on the interface to allow various positions in the automatic command execution buffer to be filled or cleared. Table 1 illustrates a reserved location in the buffer with an exemplary set of commands and conditions. Associated with each automatic command is a condition that describes under what condition the command is to be executed.

TABLE 1

| Command Buffer Entry | Command | Condition |
|---|---|---|
| 1 | Mode 1 | MRT + 1 |
| 2 | Mode 2 | IDC < 30% |
| 3 | Mode 3 | Temp > 80% |
| 4 | Scan | TOD + n |
| 5 | Seek | MRT + n |
| 6 | Stop Unit | (MRT + n) & (IDC < 40%) |
| 7 | Mode 4 | OTF > 40% |
| 8 | Empty | Empty |

Table 2 provides a description of the commands listed in Table 1. Those skilled in the art will now realize that any interface command that the host can initiate can potentially be included in Table 1.

TABLE 2

| Command | Description |
|---|---|
| Mode 1 | Power down electronics (can still receive host commands) |
| Mode 2 | Lower Speed Processing |
| Mode 3 | Reduce power to VCM (reduces access performance) |
| Mode 4 | Higher bandwidth track following operation |
| Scan n | Move head slowly across disk n full passes |
| Seek n | Move head to a reserved wear track |
| Stop Unit | Complete power down (restart may require host initiation) |

The seek command is utilized to move a slider to a preselected wear track. This command is particularly useful for contact recording systems, although it may be used in other disk drive unit types. Lower speed processing is utilized if duty cycle times are very low because high performance is not needed to meet requests and lower speed processing saves power. The scan command results in a slider being moved steadily over an entire disk surface, which is needed if contact recording is used and lubricating material needs to be smoothed over the surface of a disk periodically. Poor track following results in higher error rates and can detract from performance. Hence adjustment of bandwidth track following mode as a function of off track frequency should reduce soft error rates.

Figure 6:
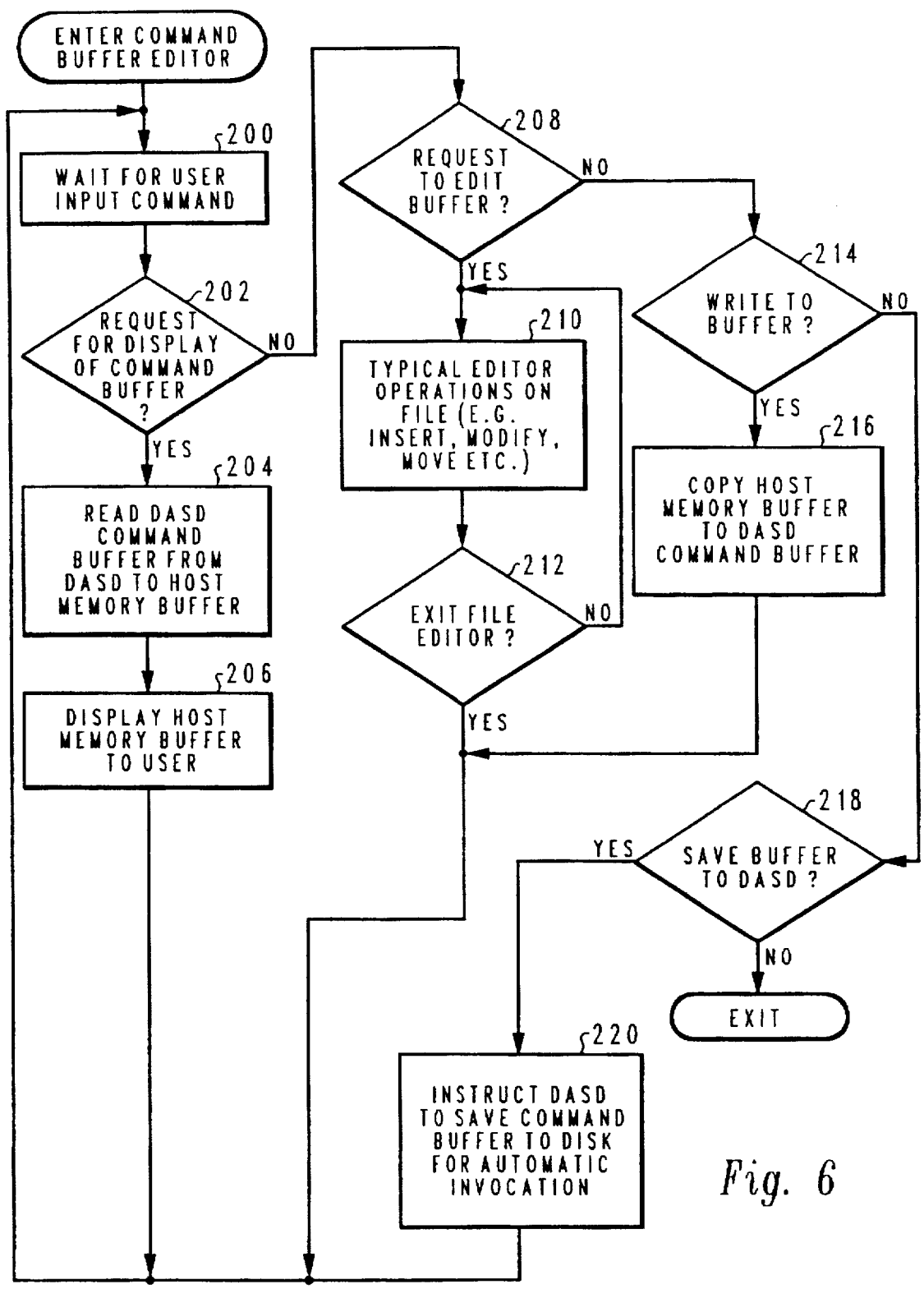
FIG. 6 is a logical flow chart of a process for editing commands in a buffer for the controller unit of FIG. 5.

Conditions as well as commands may be edited through the editor process of FIG. 6. Conditions employed for invoking the various commands of Table 1 are described in Table 3.

TABLE 3

| Condition | Description |
|---|---|
| MRT + n | n sectors on disk encountered since Most Recent Transfer |
| IDC < 30% | Interface Duty Cycle less than 30% utilized |
| Temp > 80% | Estimated coil current taken as a proxy for temp. |
| TOD + n | Time of Day + n time increments |
| OTF > 40% | Off Track Frequencies greater than 40% of specified rate |

As seen from FIG. 4 a disk is divided into a number of sectors. A variable indicating the number of sectors encountered since the most recent transfer is tracked by processing unit 176. Transfer of information in either direction across in interface 175 is also monitored by processing unit 176. For a given immediate past time period, cycles occurring within the time period are noted. Thus for any given moment an immediate estimate of utilization of the interface is available. The voice coil motor is subject to damage from excessive temperatures. As a proxy for coil temperature, the coil current being commanded is monitored. If coil current exceeds 80% of a maximum limit over a given time period the condition indicated by temperature greater than 80% is assumed satisfied. The condition TOD+n is identified as time of day and every nth increment after power up. In essence this condition is satisfied once every nth time increment. The condition OTF greater than 40% equates with off track frequencies greater than 40% of specified rate. Essentially this is a measure of how closely the head is tracking a given track.

FIG. 6 is a command buffer editor which may be invoked and used by a user to control the contents of the buffer depicted in Table 1. The process is entered at step 200 to wait on a user for input of an editing command. Next, after receipt of an editing command, step 202 is executed to determine if the command is a request for display of the current contents of the command buffer. If yes, the command buffer is read from the DASD controller into host memory at step 204 and at step 206 transferred from host memory to a video display buffer for display to a user. After step 206 operation refer turns to step 200 to await further user input of editing commands.

If the user input editing command was other than a request for display of the command buffer, the NO branch is followed from step 202 to step 208. At step 208 it is determined if the command is one to edit the contents of the command buffer. If it is, the YES branch is taken from step 208 to step 210 to provide typical editor operations on the command buffer file (e.g. insert, modify, move etc.). Text editing operations can readily be provided by programs such as Edlin. Subsequent to entry by a user of an editing operation, step 212 is executed on the operation to determine if it is a request to exit the file editor. If it is not the NO branch is followed back to step 210 to allow continued editing operations. If the file editor has been exited, the YES branch is taken back to step 200 to await another user input command.

If at step 208 the user request was for some other function than editing of the buffer, the NO branch is followed to step 214 where it is determined if the user has requested a write to the buffer. If yes, the YES branch is followed from step 214 to step 216 where the host memory buffer is copied to the DASD command buffer. After step 216 operation is returned to step 200.

If at step 214 a command other than a write to buffer was presented, the NO branch is taken to step 218 to determine if the request was one to save the command buffer disk. If the command is one to save the buffer to disk, the YES branch is taken to step 220 where the DASD is instructed to save the command buffer to disk for auto invocation. After step 220 processing is returned to step 200. If at step 218 some other command then one to save buffer to disk was presented, it is assumed to be one requesting existing of the command buffer editor. In this respect it should be understood that the command buffer editor is different than the file editor used in step 210 to modify a list for saving to the command buffer. The NO branch from step 218 exits the process.

Figure 7:
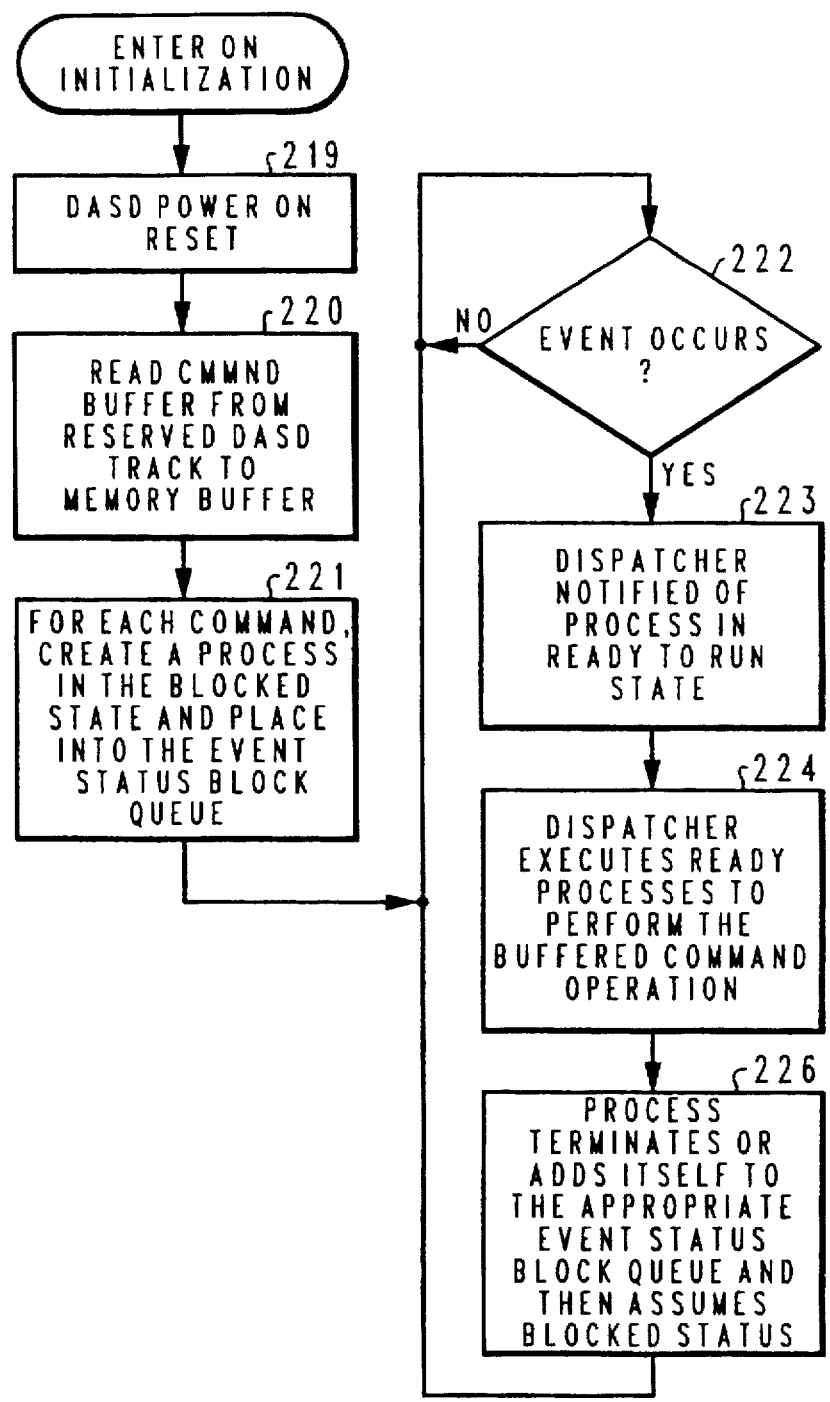
FIG. 7 is a logical flow chart of a process for automatic loading and event handling of commands for a controller unit.

FIG. 7 is a logical process for a supervisor program for DASD controller 160. There is no exit from the process of FIG. 7. The supervision simply discontinues processing upon power down of the DASD controller. Finally, the process of FIG. 7 is interruptable at any time to meet demands of the host for reading or writing data. The process of FIG. 7 is termed a supervisor program and has many functions analogous to those of an operating system. The program represented by FIG. 7 may be loaded from disk 171 into buffer 178 for processing unit operation, or may be permanently installed in ROM 180.

The process is entered at step 219 upon DASD power on reset. Next, at step 220, the command buffer is read from a reserved DASD track into the memory buffer. Next, at step 221, each command read into the command buffer is used to create a process in the blocked state which is indicated by placement of a marker into an event status block queue. Now the process enters an endless loop representing event handling and dispatching aspects of the process. Step 222 provides for detection of an event. Until a control event occurs, the process loops back on itself along the NO branch from the step. Step 223 provides for notification of a dispatcher of commands in the ready to run state. In step 224 the dispatcher executes ready processes to perform the buffered command operation. Next, at step 226, a process terminates or adds itself to the appropriate event status block queue and then assumes a blocked status. Following step 226 processing returns to step 222 for execution of the event handling operations.

Figure 8:
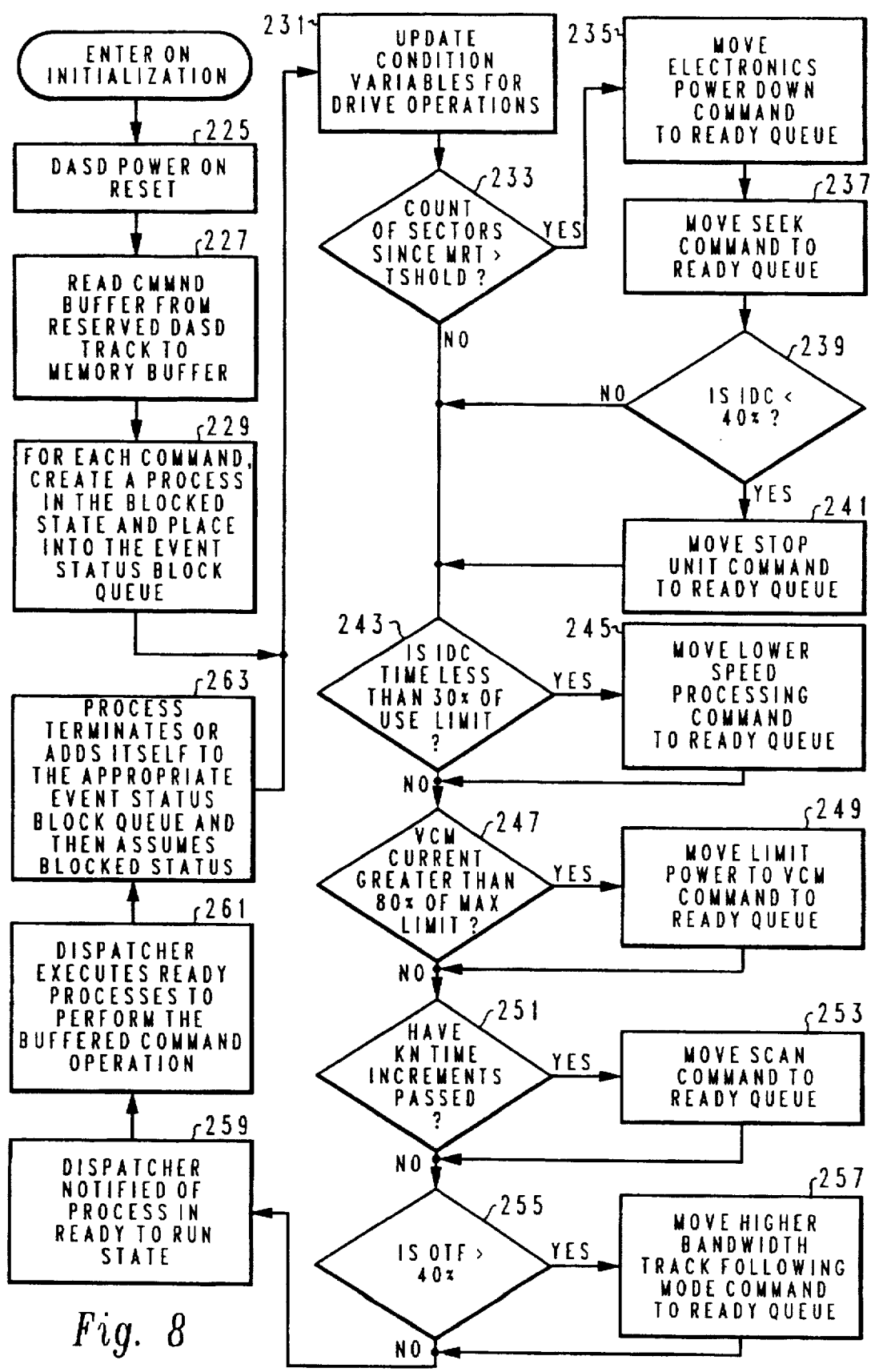
FIG. 8 is a logical flow chart of a process for automatic loading and event handling of a specified set of commands for disk drive management.

FIG. 8 is a logical flow chart illustrating a specialized supervisor program based on the process of FIG. 7, which is entered upon initialization of a direct access storage device. Steps 225–229 represent initialization of the drive, while steps 231–257 represent an event handler. The process is entered at step 225 upon DASD power on reset. Next, at step 227, the command buffer is read from a reserve DASD track into the memory buffer. Next, at step 229, each command read into the command buffer is used to create a process in the blocked state which is indicated by placement of a marker into an event status block queue. After step 229, step 231 represents updating of condition variables from DASD operations. All of the condition variables in Table 1 are determined by processing unit 176 analyzing its own operations. However, conditions may be detected by sensors and brought into the processing unit via interrupts.

Subsequent to step 231, step 233 is executed to determine if the count of sectors since most recent transfer exceeds a threshold value. If yes, step 235 is executed to move an electronics power down command to a ready queue. Additionally, step 237 is executed to move a seek command to the ready queue. For purposes of this flow chart it is assumed that the command of buffer 1, buffer 5 and buffer 6 of Table 1 utilize the same threshold condition relating to most recent transfer. After step 237, step 239 is executed to determine if the interface duty cycle has fallen to less than 40%. If it does not, step 241 is omitted. However, if the interface duty cycle is less than 40%, step 241 is executed to move the stop unit command to the ready queue.

Along the NO branch from steps 233 and 239 or after step 241, step 243 is executed. At step 243 it is determined if the interface duty cycle time is less than 30% of the utilization limit. If yes, the lower speed processing command may be moved from the status block queue to the ready queue. Following the NO branch from step 243, or after step 245, step 247 is executed. In step 247 it is determined if voice coil motor current is greater than 80% of the maximum limit over a given time period. If yes, a limit power command is moved from the status block queue to the ready queue. Next, step 251 is executed to determine if exactly N or K×N (where K is an integer) time increments have passed since power up. If yes, a scan command is moved to the ready queue. Next, in step 255 it is determined if off track frequency exceeds 40%. If yes, step 257 is executed to move a higher band width track following mode command into the ready queue.

Subsequent to step 255 along the NO branch, or after step 257, step 259 is executed. Step 259 provides for notification of a dispatcher of commands in the ready to run state. In step 261 the dispatcher executes ready processes to perform the buffered command operation. Next, at step 263 a process terminates or adds itself to the appropriate event status block queue and then assumes a blocked status. Following step 263 processing returns to step 231 for execution of the event handling operations.

Although some commands supported by the DASD cannot be executed automatically by the DASD without intervention from the host, many can be. The invention provides execution of a host of operations supported directed to such tasks as power management, background data verification, operational maintenance, etc., without host involvement.

While the invention has been particularly shown and described with reference to a preferred embodiment, it will be understood by those skilled in the art that various changes in form and detail may be made therein without departing from the spirit and scope of the invention.

What is claimed is:

1. A method of performing a set of operations pertaining to a direct access storage device within a computer, said method comprising the steps of:
   storing a plurality of commands in a memory buffer within said direct access storage device, wherein each of said plurality of commands is associated with one of a plurality of predetermined conditions within said direct access storage device;
   determining whether or not an operational event should occur in response to an occurrence of one of said plurality of predetermined conditions within said direct access storage device;
   in response to a determination that an operational event should not occur, returning to said determining step; and
   in response to a determination that an operational event should occur, executing one of said plurality of commands associated with said occurrence of one of said predetermined conditions to perform said operational event, and returning to said determining step, wherein said computer is freed from having to manage the execution of said set of operations.

2. The method of performing a set of operations pertaining to a direct access storage device within a computer according to claim 1, said step of storing a plurality of commands further comprises:
   storing a plurality of commands from a rotating storage medium within said direct access storage device into said memory buffer.

3. The method of performing a set of operations pertaining to a direct access storage device within a computer according to claim 1, said method further comprises the step of:
   creating a process in a blocked state for each of said plurality of commands.

4. The method of performing a set of operations pertaining to a direct access storage device within a computer according to claim 3, said method further comprises the steps of:
   changing said process to a ready-to-run state; and
   terminating said process or reversing said process to said blocked state after a completion of said operational event.

5. The method of performing a set of operations pertaining to a direct access storage device within a computer according to claim 1, said method further comprises the step of:
   replacing said plurality of commands with a second set of commands in response to a user selection.

6. The method of performing a set of operations pertaining to a direct access storage device within a computer according to claim 1, said determining step further comprises the steps of:
   detecting the number of sectors encountered since a most recent data transfer;
   determining an interface duty cycle;
   measuring current in an actuator motor for moving a transducing head for said rotating storage medium averaged over time;
   counting time increments; and
   resolving off track frequency.

7. A computer program product residing on a direct access storage device within a computer for performing a set of operations pertaining to said direct access storage device such that said computer is freed from having to manage the execution of said set of operations, said computer program product comprising:
   a storing mechanism for storing a plurality of commands in a memory buffer within said direct access storage device, wherein each of said plurality of commands is associated with one of a plurality of predetermined conditions within said direct access storage device;
   a determining mechanism for determining whether or not an operational event should occur in response to an occurrence of one of said predetermined conditions within said direct access storage device;
   a deferral mechanism for withholding execution of any of said plurality of commands, in response to a determination that an operational event should not occur; and
   an executing mechanism for executing one of said plurality of commands associated with said occurrence of one of said plurality of predetermined conditions to perform said operational event, in response to a determination that an operational event should occur.

8. The computer program product residing on a direct access storage device within a computer for performing a set of operations pertaining to said direct access storage device according to claim 7, said computer program product further comprising:
   a transferring mechanism for storing a plurality of commands from a rotating storage medium within said direct access storage device into said memory buffer.

9. The computer program product residing on a direct access storage device within a computer for performing a set of operations pertaining to said direct access storage device according to claim 7, said computer program product further comprising:
   a replacing mechanism for replacing said plurality of commands with second set of commands in response to a user selection.

10. The computer program product residing on a direct access storage device within a computer for performing a set of operations pertaining to said direct access storage device according to claim 7, said computer program product further comprising
    an initiating mechanism for initiating a process in a blocked state for each of said plurality of commands.

11. The computer program product residing on a direct access storage device within a computer for performing a set of operations pertaining to said direct access storage device according to claim 10, said computer program product further comprising
    a setting mechanism for setting said process to a ready-to-run state, and for reversing said process to said blocked state after a completion of said operational event.

12. The computer program product residing on a direct access storage device within a computer for performing a set of operations pertaining to said direct access storage device according to claim 7, wherein said program code means for determining further comprises:
    a sector mechanism for detecting the number of sectors encountered since a most recent data transfer;
    an interface duty cycle mechanism for determining an interface duty cycle;
    an current measuring mechanism for measuring current in an actuator motor for moving a transducing head for said rotating storage medium averaged over time;
    a timing mechanism for counting time increments; and
    a tracking mechanism for resolving off track frequency.

13. A direct access storage device, comprising:
    an interface for connection to a host system bus;
    a rotating storage medium for storing data and instructions;

a controller responsive to a command selected from a command set for managing the rotating storage medium;

a command buffer for storing commands for the controller;

an event handler executed by the controller for transferring the selected command to a ready queue, the event handler including means for detecting the number of sectors encountered since a most recent transfer on the interface, and means for moving a power down command to the ready queue responsive to the number of sectors encountered since the most recent transfer exceeding a threshold count; and a dispatcher for transferring the selected command in the ready queue to the controller for execution.

14. A direct access storage device, comprising:

an interface for connection to a host system bus;

a rotating storage medium for storing data and instructions;

a controller responsive to a command selected from a command set for managing the rotating storage medium;

a command buffer for storing commands for the controller;

an event handler executed by the controller for transferring the selected command to a ready queue, the event handler including means for determining an interface duty cycle, means for moving a lower speed processing command to the ready queue responsive to the interface duty cycle falling below a selected minimum threshold; and a dispatcher for transferring the selected command in the ready queue to the controller for execution.

15. A direct access storage device, comprising:

a rotating storage medium for storing data and instructions;

a controller responsive to a command selected from a command set for managing the rotating storage medium;

a command buffer for storing commands for the controller;

an event handler executed by the controller for transferring the selected command to a ready queue, the event handler including means for measuring current in an actuator motor for moving a transducer head for the rotating storage medium averaged over time periods; and means for moving a limit power command to the ready queue responsive to average current in the actuator motor for moving the transducer head over the rotating storage medium exceeding a percentage of a maximum limit for a period of time; and a dispatcher for transferring the selected command in the ready queue to the controller for execution.

16. A direct access storage device, comprising:

an interface for connection to a host system bus;

a rotating storage medium for storing data and instructions;

a controller responsive to a command selected from a command set for managing the rotating storage medium;

a command buffer for storing commands for the controller;

an event handler executed by the controller for transferring the selected command to a ready queue, the event handler including means for detecting the number of sectors encountered since a most recent transfer on the interface, means for determining an interface duty cycle, and means for moving a stop unit command to the ready queue responsive to the number of sectors encountered since the most recent transfer exceeding a threshold count and the interface duty cycle falling below a selected minimum threshold; and a dispatcher for transferring the selected command in the ready queue to the controller for execution.

17. A direct access storage device within a computer, said direct access storage device comprising:

a memory buffer for storing a plurality of commands, wherein each of said plurality of commands is associated one of a plurality of predetermined condition;

a determining means for determining whether or not an operational event should occur in response to an occurrence of one of said plurality of predetermined conditions;

a processing means for executing one of said plurality of commands associated with said occurrence of one of said predetermined conditions to perform said operational event, in response to a determination that an operational event should occur, wherein said direct access storage device is able to self-execute said plurality of commands such that said computer can be freed from having to manage the execution of said plurality of commands.

18. The direct access storage device according to claim 17; wherein said plurality of commands comprises:

a power down command;

a stop unit command;

a seek wear track command;

a lower speed processing command;

a limit power to actuator motor command;

a scan disk command; and a higher bandwidth track following mode command.

19. The direct access storage device according to claim 17, said direct access storage device further comprising:

an initiating means for initiating a process in a blocked state for each of said plurality of commands.

20. The direct access storage device according to claim 17, said direct access storage device further comprising:

a changing means for changing said process to a ready-to-run state; and a terminating means for terminating said process or a reversing means for reversing said process to said blocked state after a completion of said operational event.

21. The direct access storage device according to claim 17, said direct access storage device further comprising:

a detecting means for detecting the number of sectors encountered since a most recent data transfer;

a determining for determining an interface duty cycle;

a measuring means for measuring current in an actuator motor for moving a transducing head for said rotating storage medium averaged over time;

a counting means for counting time increments; and a resolving means for resolving off track frequency.

* * * * *

UNITED STATES PATENT AND TRADEMARK OFFICE
CERTIFICATE OF CORRECTION

PATENT NO.   :   5,794,056
DATED        :   August 11, 1998
INVENTOR(S)  :   Dana H. Brown It is certified that error appears in the above-identified patent and that said Letters Patent is hereby corrected as shown below:

Claim 1, Col. 9, Lines 8 and 9, "within said direct access storage device" should be DELETED.

Claim 1, Col. 9, Lines 12 and 13, "within said direct access storage device" should be DELETED.

Claim 7, Col. 10, Line 5, "within said direct access storage device" should be DELETED.

Claim 7, Col. 10, Line 9, "within said direct access storage device" should be DELETED.

Signed and Sealed this

Fourth Day of May, 1999

Attest:

Attesting Officer

Q. TODD DICKINSON

Acting Commissioner of Patents and Trademarks